United States Patent
Lin et al.

(10) Patent No.: US 11,176,039 B2
(45) Date of Patent: Nov. 16, 2021

(54) CACHE AND METHOD FOR MANAGING CACHE

(71) Applicant: REALTEK SEMICONDUCTOR CORPORATION, Hsinchu (TW)

(72) Inventors: Jui-Yuan Lin, Chiayi County (TW); Yen-Ju Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 93 days.

(21) Appl. No.: 16/665,012

(22) Filed: Oct. 28, 2019

(65) Prior Publication Data

US 2020/0242032 A1 Jul. 30, 2020

(30) Foreign Application Priority Data

Jan. 24, 2019 (TW) .................................. 108102763

(51) Int. Cl.
*G06F 12/00* (2006.01)
*G06F 12/0811* (2016.01)

(52) U.S. Cl.
CPC .... *G06F 12/0811* (2013.01); *G06F 2212/608* (2013.01); *G06F 2212/6012* (2013.01)

(58) Field of Classification Search
CPC ............... G06F 12/0811; G06F 12/084; G06F 2212/1021; G06F 2212/502; G06F 2212/6012; G06F 2212/608
See application file for complete search history.

(56) References Cited

U.S. PATENT DOCUMENTS

| | | | |
|---|---|---|---|
| 5,369,753 A | 11/1994 | Tipley | |
| 5,386,547 A | 1/1995 | Jouppi | |
| 2007/0143550 A1 | 6/2007 | Rajwar et al. | |
| 2013/0042070 A1 | 2/2013 | Jalal et al. | |
| 2017/0371784 A1* | 12/2017 | Alsop | G06F 12/0811 |
| 2018/0357175 A1 | 12/2018 | Jiang | |

OTHER PUBLICATIONS

OA letter of the counterpart TW application (appl No. 109116171) mailed on Jan. 11, 2021. Summary of the OA letter is attached.
OA letter of the counterpart TW application (appl. No. 108102763) mailed on Feb. 10, 2020. Summary of the OA letter: Reference 1(US20180357175 A1) renders claims 1-7 obvious.

* cited by examiner

*Primary Examiner* — Yong J Choe
(74) *Attorney, Agent, or Firm* — WPAT, PC

(57) ABSTRACT

A cache and a method for managing a cache are provided. The cache includes a storage circuit, a buffer circuit and a control circuit. The buffer circuit stores data in a first-in first-out (FIFO) manner. The control circuit is coupled to the storage circuit and the buffer circuit and is configured to find a storage space in the storage circuit and write the data to the storage space.

20 Claims, 7 Drawing Sheets

CACHE AND METHOD FOR MANAGING CACHE

BACKGROUND

1. Field of the Disclosure

The present disclosure generally relates to caches, and, more particularly, to multi-level caches.

2. Description of Related Art

FIG. 1 is a block diagram of a conventional electronic device. The electronic device 100 includes a processor 110, a first level (also known as level-1, hereinafter referred to as L1) cache 120, a second level (also known as level-2, hereinafter referred to as L2) cache 130 and a system memory 140. The L1 cache 120 and the L2 cache 130 are typically static random-access memories (SRAMs), whereas the system memory 140 is typically a dynamic random-access memory (DRAM). The L2 cache 130 includes a control circuit 132 and a storage circuit 136. The control circuit 132 writes data to or reads data from the storage circuit 136. The data structure of the storage circuit 136 and the algorithms which the control circuit 132 adopts to access the storage circuit 136 are well known to people having ordinary skill in the art and are thus omitted for brevity. The electronic device 100 may have various issues when the caches are either in the inclusive mode or in the exclusive mode, and these issues for the inclusive mode and the exclusive mode are discussed below, respectively. The inclusive mode and the exclusive mode are well known to people having ordinary skill in the art, and the details are thus omitted for brevity.

FIG. 2 is a partial flow chart of the electronic device 100 operating in the inclusive mode. When a read miss occurs in the L1 cache 120, the L1 cache 120 requests the L2 cache 130 for data (step S210). In step S220, the control circuit 132 checks whether the data requested by the L1 cache 120 is stored in the storage circuit 136. If the data requested by the L1 cache 120 is not stored in the storage circuit 136 (i.e., a read miss in L2 cache), the control circuit 132 requests the system memory 140 for data (step S230). Next, the L2 cache 130 receives data from the system memory 140 (step S240) and then sends the data to the L1 cache 120 (step S250). After receiving the data from the L2 cache 130, the L1 cache 120 stores the data. Finally, the L1 cache 120 broadcasts the data to the L2 cache 130 (step S260). In step S260, the control circuit 132 must check the tags in the storage circuit 136 and write the data to the storage circuit 136. Since the capacity of the L2 cache 130 is typically greater than the capacity of the L1 cache 120, accessing the storage circuit 136 consumes more time. For example, if accessing the L1 cache 120 requires one cycle of the system clock, it may take two to three cycles to access the storage circuit 136. Since step S260 is relatively time consuming, the control circuit 132 cannot immediately proceed to carry out the next access command, leading to stalls in the processor 110.

FIG. 3 is a partial flow chart of the electronic device 100 operating in the exclusive mode. When a read miss occurs in the L1 cache 120, the L1 cache 120 requests the L2 cache 130 for data (step S310). In step S320, the control circuit 132 checks whether the data requested by the L1 cache 120 is stored in the storage circuit 136. If the data requested by the L1 cache 120 is stored in the storage circuit 136 (i.e., a read hit in the L2 cache), the control circuit 132 sends the data to the L1 cache 120 (step S330). Next, a line data is evicted from the L1 cache 120 and then written to the L2 cache 130 (step S340). In step S340, the control circuit 132 must check the tags in the storage circuit 136 and write the line data to an appropriate location in the storage circuit 136. Since accessing the storage circuit 136 is relatively time consuming, step S340 may prevent the control circuit 132 from immediately proceeding to carry out the next access command, leading to stalls in the processor 110.

SUMMARY

In view of the issues of the prior art, an object of the present disclosure is to provide a cache and a method for managing a cache, so as to improve the performance of the electronic device.

A cache is provided. The cache includes a storage circuit, a buffer circuit and a control circuit. The buffer circuit is configured to store a data in a first-in first-out manner. The control circuit is coupled to the storage circuit and the buffer circuit and configured to find a storage space in the storage circuit and to write the data to the storage space.

A method for managing a cache is also provided. The cache includes a storage circuit and a buffer circuit. The buffer circuit stores data in a first-in first-out manner. The method includes the following steps: when a target data is being written to the cache, writing the target data to the buffer circuit without checking the storage circuit; and finding a storage space in the storage circuit and writing the target data to the storage space.

A cache is also provided. The cache includes a first level cache, a second level cache and a register. The first level cache includes a first control circuit. The second level cache includes a second control circuit. The register is coupled to the first control circuit and the second control circuit. The first control circuit and the second control circuit refer to a register value of the register to respectively control the first level cache and the second level cache to operate in an inclusive mode or an exclusive mode.

According to the present disclosure, the access speed of the cache is improved due to the arrangement of a buffer circuit in the cache. Compared with the conventional technology, processor stall is less likely to occur in the electronic device employing the cache of the present disclosure. Furthermore, the cache of the present disclosure is easy to switch between the inclusive mode and the exclusive mode.

These and other objectives of the present disclosure no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes caches and a method for managing caches. On account of that some or all elements of the cache could be known, the detail of such elements is omitted provided that such detail has little to do with the features of this disclosure, and that this omission nowhere dissatisfies the specification and enablement requirements. Some or all of the processes of the method for managing caches may be implemented by software and/or firmware and can be performed by the cache or its equivalent. A person having ordinary skill in the art can choose components or steps equivalent to those described in this specification to carry out the present disclosure, which means that the scope of the present disclosure is not limited to the embodiments in the specification.

Figure 1:
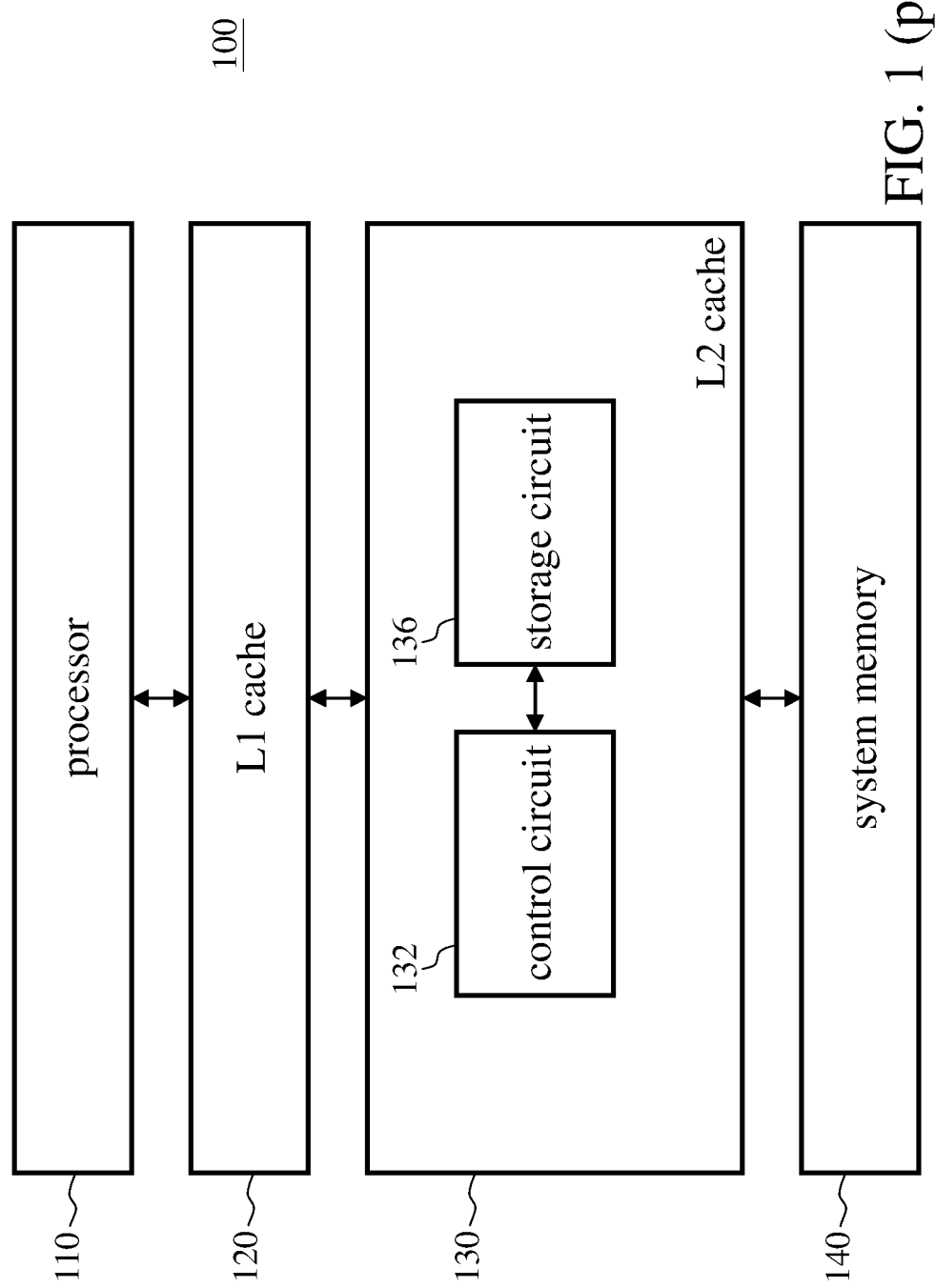
FIG. 1 illustrates a block diagram of a conventional electronic device.
Figure 2:
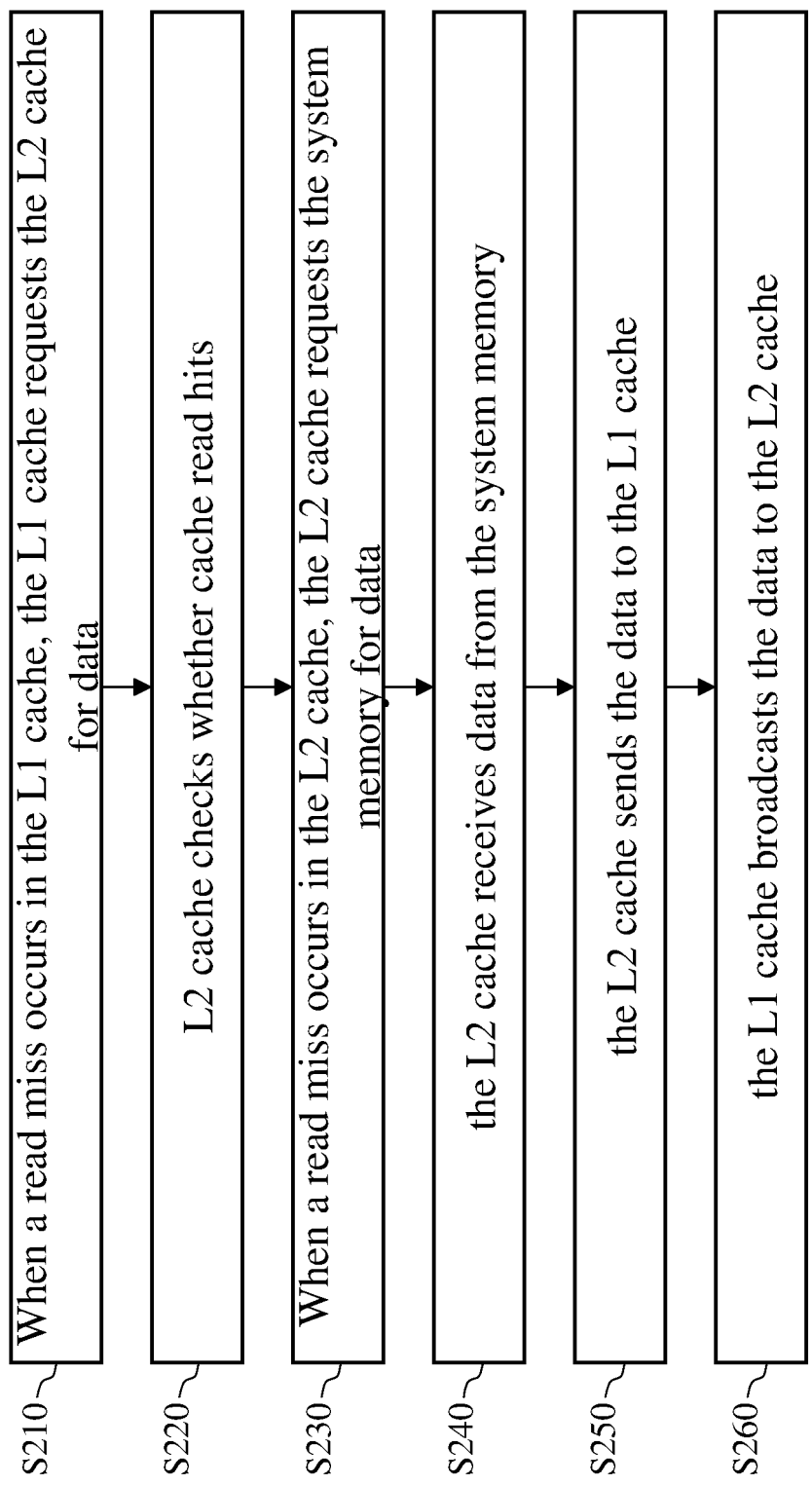
FIG. 2 illustrates a partial flow chart of a conventional electronic device operating in the inclusive mode.
Figure 3:
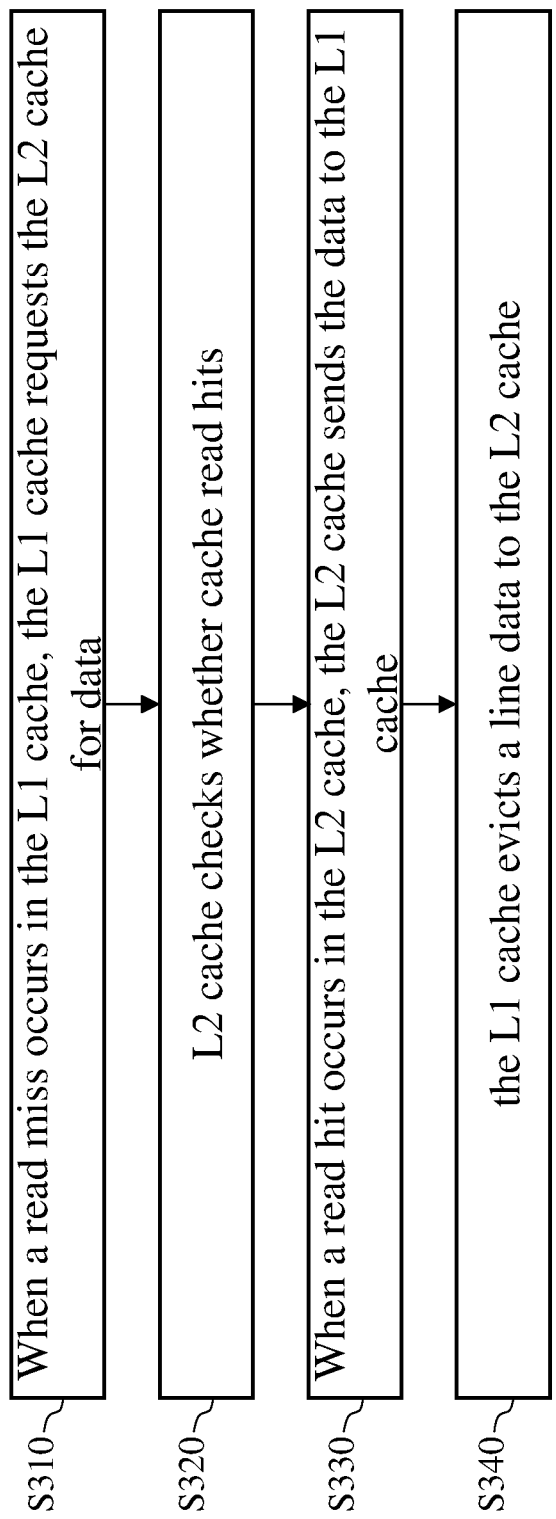
FIG. 3 illustrates a partial flow chart of a conventional electronic device operating in the exclusive mode.
Figure 4:
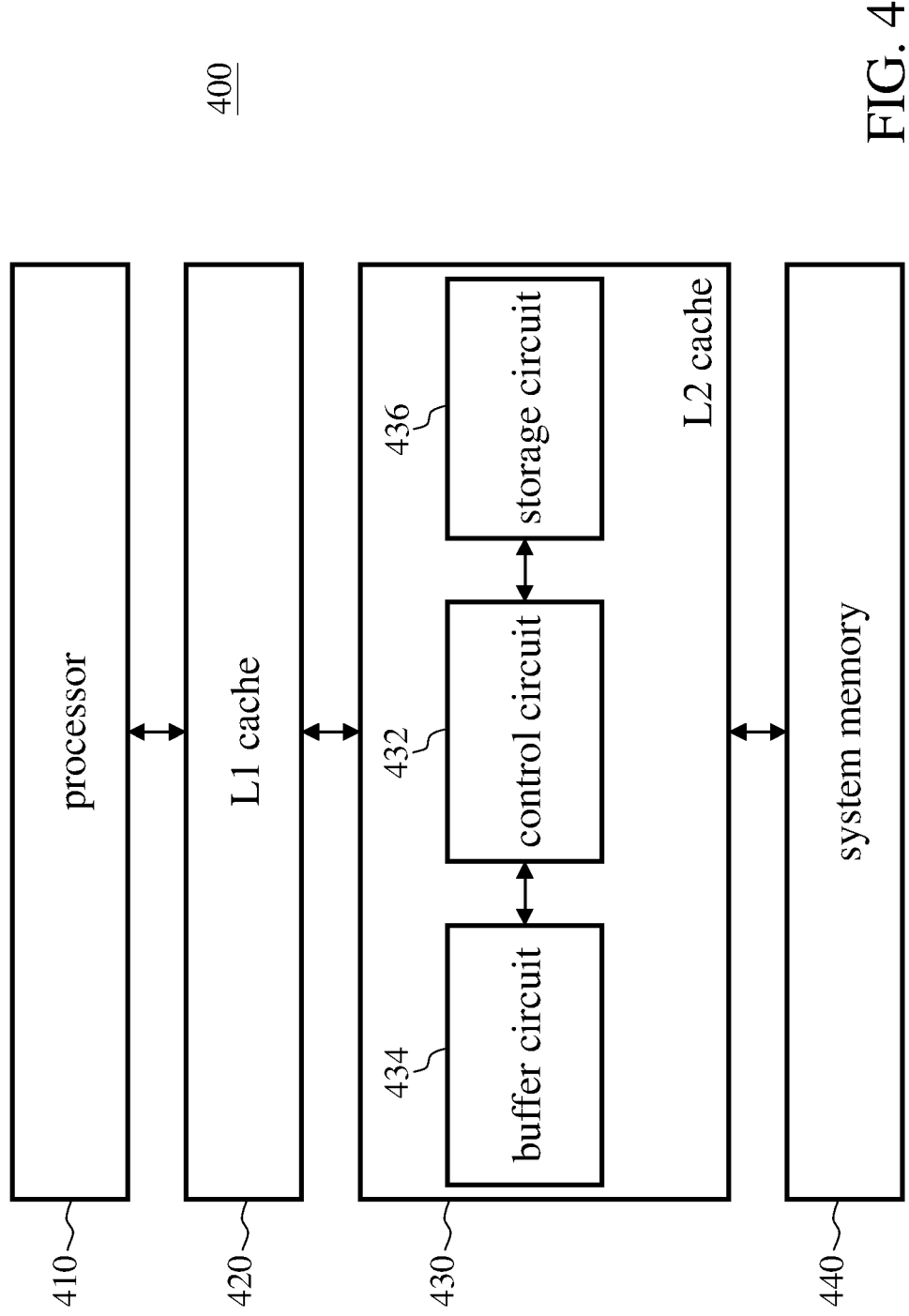
FIG. 4 illustrates a block diagram of an electronic device according to an embodiment of the present disclosure.

FIG. 4 illustrates a block diagram of an electronic device according to an embodiment of the present disclosure. The electronic device 400 includes a processor 410, an L1 cache 420, an L2 cache 430 and a system memory 440. The L2 cache 430 includes a control circuit 432, a buffer circuit 434 and a storage circuit 436. The buffer circuit 434 stores data in a first-in first-out (FIFO) manner, while the storage circuit 436 does not store data in a FIFO manner. In some embodiments, the capacity of the buffer circuit 434 is smaller than the capacity of the storage circuit 436. Thus, the time the control circuit 432 takes to access the buffer circuit 434 may be less than the time the control circuit 432 takes to access the storage circuit 436. That is to say, the control circuit 432 may have a higher speed to access the buffer circuit 434 than to access the storage circuit 436. The storage circuit 436 stores multiple tags and multiple data corresponding to the tags. The data structure of the storage circuit 436 is well known to people having ordinary skill in the art and is thus omitted for brevity. The buffer circuit 434 can be implemented by SRAMs or registers, e.g., flip-flops, and the storage circuit 436 can be implemented by SRAMs. The L1 cache 420 and the L2 cache 430 can operate in the inclusive mode or the exclusive mode.

Figure 5:
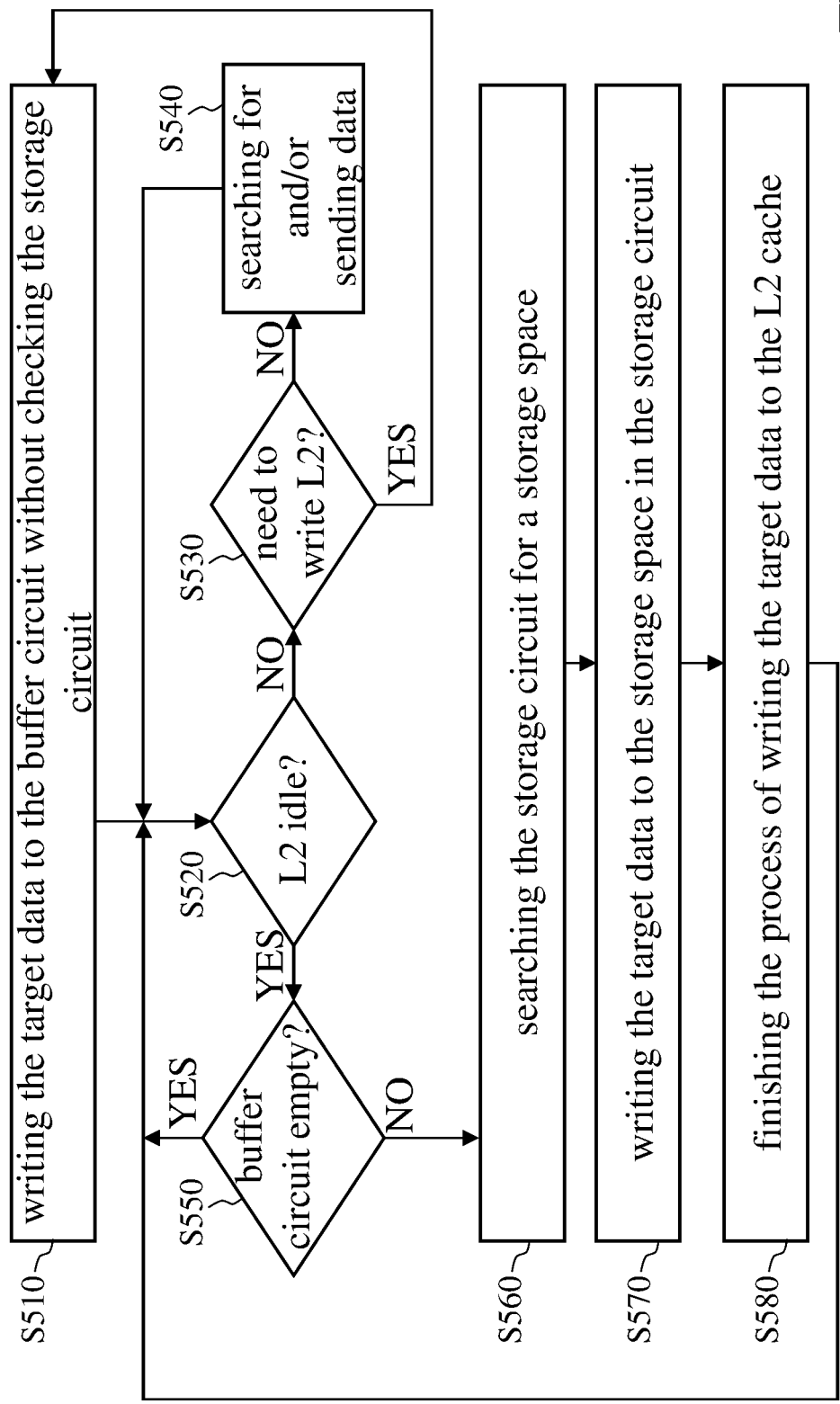
FIG. 5 illustrates a flow chart of a cache management method according to an embodiment of the present disclosure.

FIG. 5 illustrates a flow chart of a cache management method according to an embodiment of the present disclosure. The flow of FIG. 5 applies to both the inclusive mode and the exclusive mode. When the control circuit 432 receives the target data from the L1 cache 420 or the system memory 440, and when the control circuit 432 is about to store the target data, the control circuit 432 writes the target data to the buffer circuit 434 without checking the tags in the storage circuit 436 (step S510). Next, the control circuit 432 determines whether the L2 cache 430 is in an idle state (step S520). If step S520 is negative (NO branch), the control circuit 432 further determines whether another target data needs to be written to the L2 cache 430 (step S530). If step S530 is positive (YES branch), the control circuit 432 writes said another target data to the buffer circuit 434 (step S510). If step S530 is negative (NO branch), the control circuit 432 searches for data and/or send the data (step S540), and this step includes accessing the buffer circuit 434 and/or the storage circuit 436. After step S540 is completed, the flow returns to step S520.

When the L2 cache 430 is in the idle state (step S520 being positive, YES branch), the control circuit 432 determines whether the buffer circuit 434 is empty (step S550). If the buffer circuit 434 does not store any data (i.e., step S550 being positive, YES branch), the flow returns to step S520. If the buffer circuit 434 is not empty (i.e., step S550 being negative, NO branch), the control circuit 432 searches the storage circuit 436 for a storage space (step S560), then reads the target data from the buffer circuit 434, and writes the target data to the storage circuit 436. (Step S570). In other words, step S560 and step S570 aim to move the target data from the buffer circuit 434 to the storage circuit 436. After being moved, the target data exists only in the storage circuit 436, and the buffer circuit 434 does not contain the target data. In other words, the buffer circuit 434 and the storage circuit 436 do not store a same line data at the same time. After step S570 is completed, the control circuit 432 finishes the process of writing the target data to the L2 cache 430 (step S580), and the flow returns to step S520.

In step S560, the storage space may be an unoccupied space or a space occupied by data to be evicted. By using algorithms such as the least recently used (LRU) algorithm and referring to the tags in storage circuit 436, the control circuit 432 can locate the data to be evicted.

As can be seen from the flow of FIG. 5, the buffer circuit 434 may store multiple target data at the same time, and the control circuit 432 sequentially reads the target data from the buffer circuit 434 in a FIFO manner and writes the target data to the storage circuit 436. In some embodiments, step S570 can be simplified when the data in the buffer circuit 434 has the same format as the data in the storage circuit 436 (e.g., in the format of a line data).

Theoretically, only one cycle of the system clock is needed to complete step S510 because the control circuit 432 is not required to check the tags in the storage circuit 436 to find a suitable storage space (either an empty storage space or a space occupied by a data to be evicted) in step S510. In comparison, the control circuit 432 needs at least two cycles of the system clock (depending on the size of the storage circuit 436) to directly write the target data to the storage circuit 436 because the control circuit 432 needs to check the tags when writing the target data to the storage circuit 436. In other words, the buffer circuit 434 can increase the speed of the L2 cache 430.

The idle state of step S520 includes two scenarios: (1) the period in which the control circuit 432 has no read/write operations to be processed; and (2) when a read miss occurs in the L2 cache 430, the period from the control circuit 432 requesting data from the system memory 440 to the control circuit 432 receiving the response from the system memory 440. Because the number of cycles of the system clock required for one access to the system memory 440 is typically much greater than the number of cycles of the system clock required for the control circuit 432 to write data to storage circuit 436, the control circuit 432 has sufficient time in scenario (2) to perform steps S560 and S570.

In summary, for the processor 410, the operation of the L2 cache 430 takes only one cycle of the system clock whether when a read miss occurs in the inclusive mode or when a read hit occurs in the exclusive mode. Therefore, the processor 410 is not stalled, which greatly improves the performance of the electronic device 400.

Figure 6:
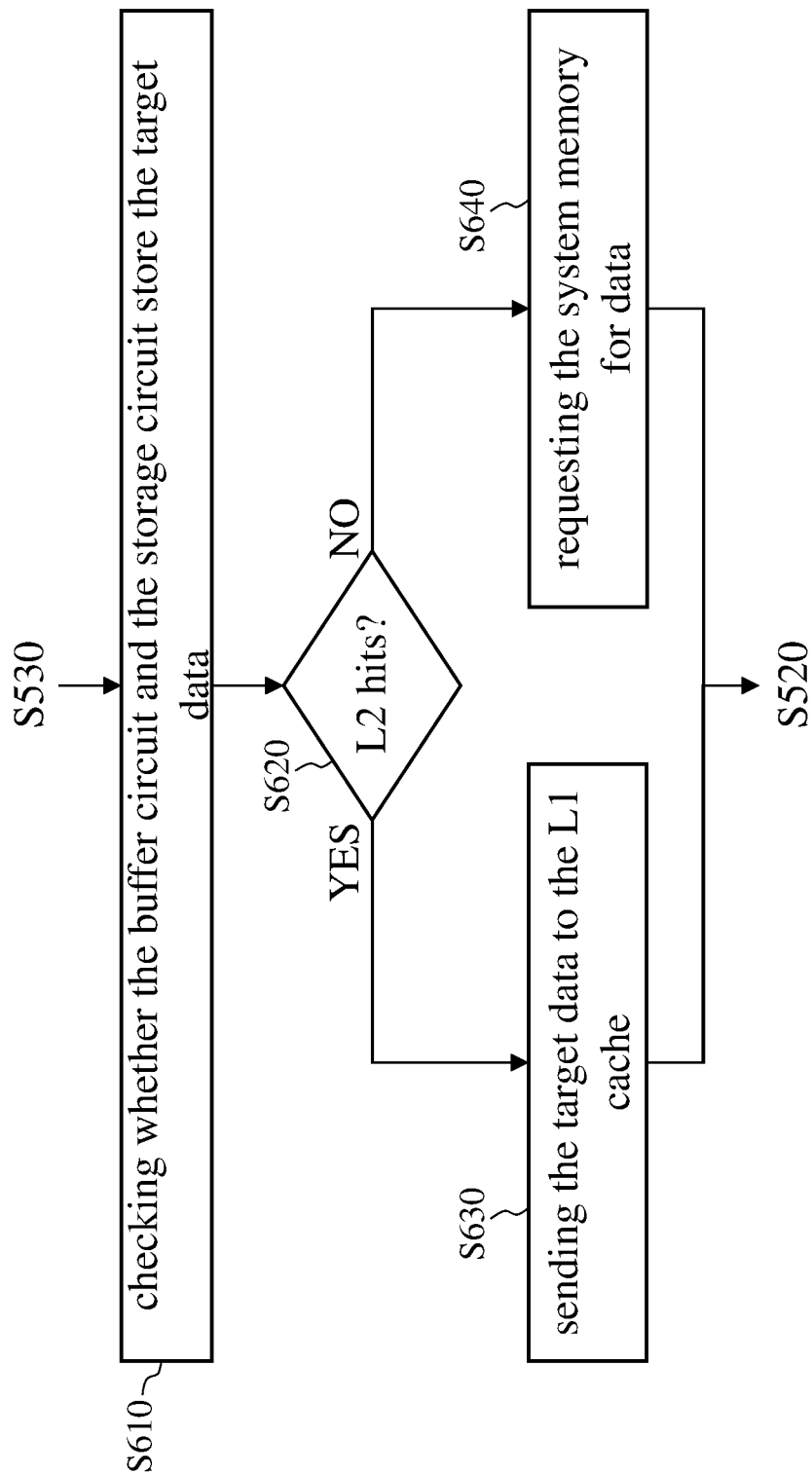
FIG. 6 illustrates a flow chart of step S540 in FIG. 5 according to an embodiment of the present disclosure.

FIG. 6 illustrates a flow chart of step S540 in FIG. 5 according to an embodiment of the present disclosure. When the L1 cache 420 requests the L2 cache 430 for data after a read miss occurs in the L1 cache 420, the control circuit 432 checks whether the buffer circuit 434 and the storage circuit 436 store the target data (step S610). When a read hit occurs in the L2 cache (i.e., the buffer circuit 434 or the storage circuit 436 stores the target data, step S620 being positive), the control circuit 432 reads the target data and sends the target data to the L1 cache 420 (step S630). When a read miss occurs in the L2 cache (i.e., neither the buffer circuit 434 nor the storage circuit 436 stores the target data, step S620 being negative), the control circuit 432 requests the system memory 440 for data (step S640).

Figure 7:
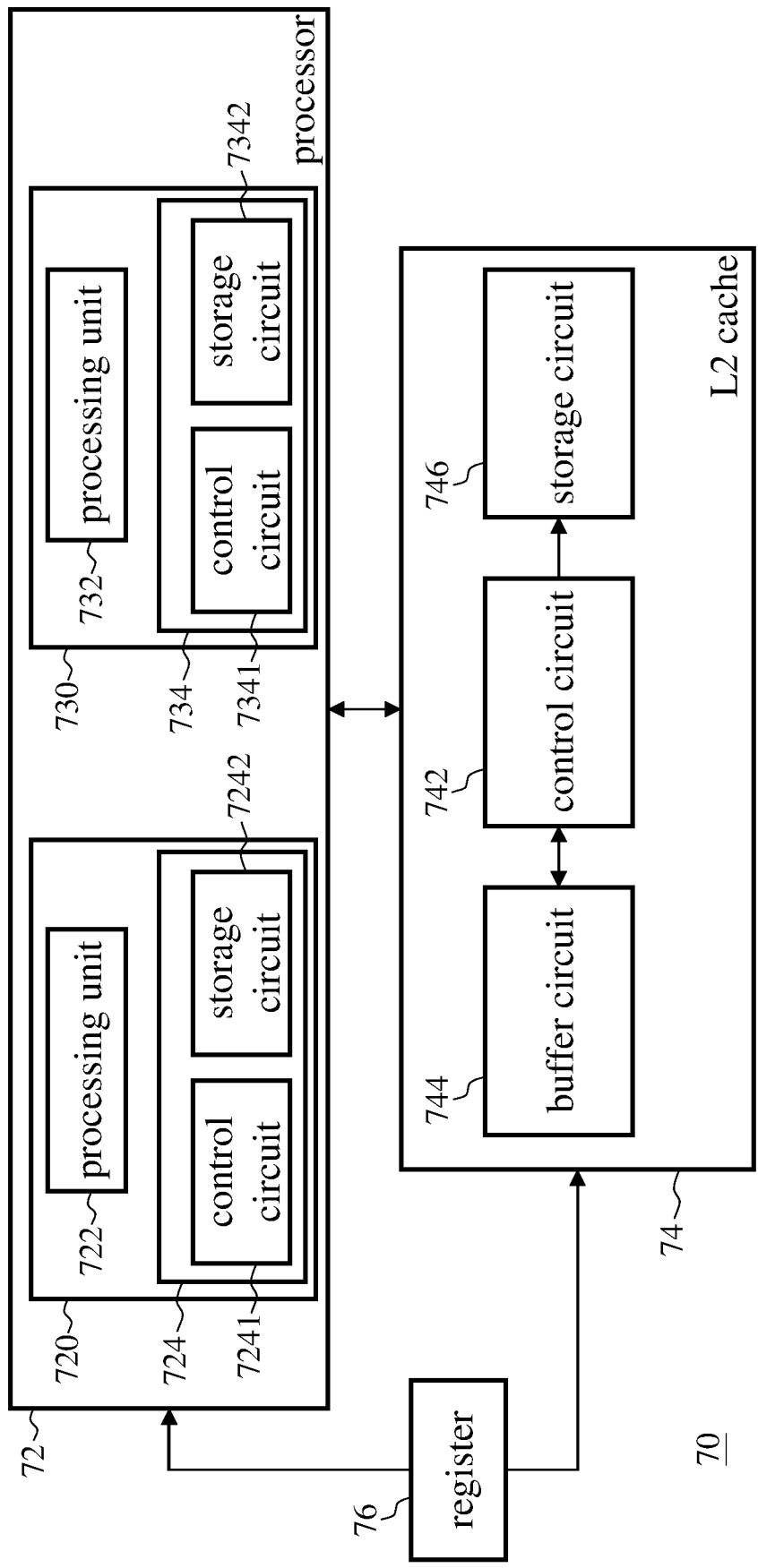
FIG. 7 illustrates a block diagram of an electronic device according to another embodiment of the present disclosure.

FIG. 7 is a block diagram of an electronic device according to another embodiment of the present disclosure. The electronic device 70 includes a processor 72, an L2 cache 74 and a register 76. The processor 72 includes a core 720 and a core 730. The core 720 includes a processing unit 722 and an L1 cache 724. The L1 cache 724 includes a control circuit 7241 and a storage circuit 7242. The core 730 includes a processing unit 732 and an L1 cache 734. The L1 cache 734 includes a control circuit 7341 and a storage circuit 7342. In short, the processor 72 is a multi-core architecture. The core 720 and the core 730 each has its own L1 cache (724 and 734, respectively) and share the L2 cache 74. The L2 cache 74 includes a control circuit 742, a buffer circuit 744 and a storage circuit 746. The functions of the control circuit 742, the buffer circuit 744 and the storage circuit 746 are similar to the control circuit 432, the buffer circuit 434 and the storage circuit 436, respectively, and are thus omitted for brevity. The control circuit 7241, the control circuit 7341 and the control circuit 742 are coupled to the register 76 and configured to read the register value of the register 76.

The control circuit 7241 of the L1 cache 724, the control circuit 7341 of the L1 cache 734, and the control circuit 742 of the L2 cache 74 refer to the register value of the register 76 to respectively control the L1 cache 724, the L1 cache 734 and the L2 cache 74 to operate in the inclusive mode or the exclusive mode. In other words, the L1 cache and the L2 cache are controlled in a programmable manner to operate in either the inclusive mode or the exclusive mode. In this way, there is no need to decide the operation mode of the L1 cache 724, the L1 cache 734 and the L2 cache 74 when the electronic device 70 is being designed. Instead, the user can set the register value of the register 76 after the completion of the circuit based on the practical applications. That is, dynamic adjustments are feasible. In some embodiments, the register 76 can be a control register of the processor 72.

The followings are some application examples of the electronic device 70.

Examples (1): in a case where the core 720 and the core 730 operate in a parallel processing mode (i.e., both executing the same program), the register value of the register 76 can be set to a first value (e.g., 1) such that the L1 cache 724, the L1 cache 734 and the L2 cache 74 operate in the inclusive mode.

Example (2): in a case where the core 720 and the core 730 respectively execute the first program and the second program that share instructions and/or data, the register value of the register 76 can be set to a first value (e.g., 1) such that the L1 cache 724, the L1 cache 734 and the L2 cache 74 operate in the inclusive mode.

Example (3): in a case where the core 720 and the core 730 respectively execute the first program and the second program that do not share instructions and/or data (i.e., the first program is independent of the second program), the register value of the register 76 can be set to a second value (e.g., 0) such that the L1 cache 724, the L1 cache 734 and the L2 cache 74 operate in the exclusive mode.

In examples (1) and (2), the inclusive mode can reduce the number of times of moving data (i.e., improving the hit rate), and so the performance of the electronic device 70 can be improved. In example (3), the L1 cache 724, the L1 cache 734 and the L2 cache 74 store more instructions and/or data in the exclusive mode, and so the performance of the electronic device 70 can be improved.

In some embodiments, the control circuit 432, the control circuit 7241, the control circuit 7341 and the control circuit 742 can be implemented by a finite state machine, which includes multiple logic circuits.

Since a person having ordinary skill in the art can appreciate the implementation detail and the modification thereto of the present method embodiment through the disclosure of the device embodiment, repeated and redundant description is thus omitted. Please note that there is no step sequence limitation for the method embodiments as long as the execution of each step is applicable. Furthermore, the shape, size, and ratio of any element and the step sequence of any flow chart in the disclosed figures are exemplary for understanding, not for limiting the scope of this disclosure.

The aforementioned descriptions represent merely the preferred embodiments of this disclosure, without any intention to limit the scope of this disclosure thereto. Various equivalent changes, alterations, or modifications based on the claims of this disclosure are all consequently viewed as being embraced by the scope of this disclosure.

What is claimed is:

1. A cache, comprising:
   a storage circuit;
   a buffer circuit configured to store a target data in a first-in first-out manner; and
   a control circuit coupled to the storage circuit and the buffer circuit and configured to find a storage space in the storage circuit, to read the target data from the buffer circuit, and to write the target data to the storage space in the storage circuit;
   wherein the target data stored in the buffer circuit is same as the target data written to the storage space in the storage circuit.

2. The cache of claim 1, wherein the target data is a first target data, and when a second target data is being written to the cache, the control circuit writes the second target data to the buffer circuit without checking the storage circuit.

3. The cache of claim 1, wherein the target data is a first target data, and when the control circuit checks whether the cache contains a second target data, the control circuit checks whether the storage circuit and the buffer circuit store the second target data.

4. The cache of claim 1, wherein a capacity of the buffer circuit is smaller than a capacity of the storage circuit.

5. The cache of claim 1, wherein the buffer circuit is implemented by registers.

6. The cache of claim 1, wherein the buffer circuit is implemented by static random-access memories (SRAMs).

7. The cache of claim 1, wherein when the cache is in an idle state, and the buffer circuit is not empty, the control circuit finds the storage space in the storage circuit and writes the target data to the storage space.

8. A method for managing a cache, the cache comprising a storage circuit and a buffer circuit, the buffer circuit storing data in a first-in first-out manner, the method comprising:

when a target data is being written to the cache, writing the target data to the buffer circuit without checking the storage circuit; and finding a storage space in the storage circuit and writing the target data read from the buffer circuit to the storage space in the storage circuit;

wherein the target data written to the buffer circuit is same as the target data written to the storage space in the storage circuit.

9. The method of claim 8 further comprising:

checking whether the storage circuit and the buffer circuit store the target data when checking whether the cache contains the target data.

10. The method of claim 8, wherein a capacity of the buffer circuit is smaller than a capacity of the storage circuit.

11. The method of claim 8, wherein the buffer circuit is implemented by registers.

12. The method of claim 8, wherein the buffer circuit is implemented by static random-access memories (SRAMs).

13. The method of claim 8, wherein when the cache is in an idle state, and the buffer circuit is not empty, the step of finding the storage space in the storage circuit and writing the target data to the storage space is performed.

14. A cache comprising:

a register storing a register value;

a first level cache, coupled to the register and comprising a first control circuit that controls, according to the register value, the first level cache to operate in an inclusive mode or an exclusive mode; and a second level cache, coupled to the register and comprising a second control circuit that controls, according to the register value, the second level cache to operate in the inclusive mode or the exclusive mode;

wherein when the register value is a first value, both the first level cache and the second level cache operate in the inclusive mode, and when the register value is a second value different from the first value, both the first level cache and the second level cache operate in the exclusive mode.

15. The cache of claim 14, wherein the second level cache is shared by a first core and a second core of a processor, the first core executes a first program and the second core executes a second program, and when the first program and the second program are programs sharing instructions or data, the register value corresponds to the inclusive mode.

16. The cache of claim 14, wherein the second level cache is shared by a first core and a second core of a processor, the first core executes a first program and the second core executes a second program, and when the first program and the second program are programs not sharing instructions or data, the register value corresponds to the exclusive mode.

17. The cache of claim 14, wherein the second level cache comprises:

a storage circuit;

a buffer circuit configured to store a data in a first-in first-out manner; and a control circuit coupled to the storage circuit and the buffer circuit and configured to find a storage space in the storage circuit and to write the data to the storage space.

18. The cache of claim 17, wherein when a target data is being written to the second level cache, the control circuit writes the target data to the buffer circuit without checking the storage circuit.

19. The cache of claim 17, wherein when the control circuit checks whether the second level cache contains a target data, the control circuit checks whether the storage circuit and the buffer circuit store the target data.

20. The cache of claim 17, wherein a capacity of the buffer circuit is smaller than a capacity of the storage circuit.

* * * * *